United States Patent
Madsen et al.

(10) Patent No.: US 11,209,345 B1
(45) Date of Patent: Dec. 28, 2021

(54) AUTOMATIC PROGNOSTIC QUALIFICATION OF MANUFACTURING PRODUCTS

(71) Applicants: John S. Madsen, Commack, NY (US); Jerrell A. Nardiello, Hicksville, NY (US); Elias L. Anagnostou, Merrick, NY (US); John A. Crawford, Miller Place, NY (US); Stephen J. Engel, East Northport, NY (US)

(72) Inventors: John S. Madsen, Commack, NY (US); Jerrell A. Nardiello, Hicksville, NY (US); Elias L. Anagnostou, Merrick, NY (US); John A. Crawford, Miller Place, NY (US); Stephen J. Engel, East Northport, NY (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 330 days.

(21) Appl. No.: 16/425,644

(22) Filed: May 29, 2019

(51) Int. Cl.
*G01N 3/06* (2006.01)
*G06N 20/00* (2019.01)
*G06N 5/04* (2006.01)

(52) U.S. Cl.
CPC ............ *G01N 3/06* (2013.01); *G06N 5/048* (2013.01); *G06N 20/00* (2019.01)

(58) Field of Classification Search
CPC ...................................................... G01N 3/06
USPC ............................................................ 702/82
See application file for complete search history.

(56) References Cited

U.S. PATENT DOCUMENTS

| | | | | |
|---|---|---|---|---|
| 8,224,605 | B2* | 7/2012 | Tasaki | H05K 13/083 702/83 |
| 2005/0210337 | A1* | 9/2005 | Chester | G05B 23/0254 714/47.2 |
| 2008/0250265 | A1* | 10/2008 | Chang | G06F 11/0709 714/4.12 |
| 2011/0191049 | A1* | 8/2011 | Chang | G16Z 99/00 702/82 |
| 2013/0315437 | A1* | 11/2013 | Kerschner | G06K 9/6202 382/100 |
| 2014/0330525 | A1* | 11/2014 | Nervi | G01M 5/0075 702/34 |

* cited by examiner

*Primary Examiner* — Ricky Go
(74) *Attorney, Agent, or Firm* — Tarolli, Sundheim, Covell & Tummino LLP

(57) ABSTRACT

A system includes a void filter that receives sensor data employed to produce or inspect a manufactured part, the void filter generates a void data subset indicating voids detected in the manufactured part. A stress analyzer processes the void data subset from the void filter and determines coordinate data and force data for the respective detected voids in the manufactured part. At least one deterministic model analyzes the coordinate data and the force data from the stress analyzer determined for the detected voids from the void data subset. The deterministic model analyzes failure of the detected voids with respect to time and generates deterministic output data indicating failure over a deterministic timeframe. A prognostic analyzer processes the deterministic output data from the at least one deterministic model and generates a failure prediction for the as manufactured part.

22 Claims, 9 Drawing Sheets

AUTOMATIC PROGNOSTIC QUALIFICATION OF MANUFACTURING PRODUCTS

TECHNICAL FIELD

This disclosure relates to product qualification systems, and more particularly to a prognostic qualification system for efficient development and deployment of manufacturing components.

BACKGROUND

The process of validating and qualifying new materials, processes and manufacturing technologies has been developed and matured over the years and, today, is capable of introducing new technology in a low-risk structured and methodical manner. However, such methodical, test-intensive methods are cumbersome, time-consuming, and expensive, and they inhibit the rapid introduction of new and improved processes, such as Additive Manufacturing (AM), due to the difficulty in managing the material/manufacturing process uncertainty in a timely manner. An example of this extensive testing can be found in how aircraft or other vehicles are currently designed/qualified. Current design methods include building block methods that extend from coupons (tens of thousands), elements (hundreds), subcomponents (dozens), components (dozens) and full-scale article static and fatigue tests (less than a dozen). When completed, introducing newer and innovative processes for flight critical structure becomes onerous due to the prohibitive cost and schedule impacts of repeating the relevant building-block test series. This stifles competition among potential suppliers and the adoption of new technology on existing and future programs.

SUMMARY

This disclosure relates to a prognostic qualification system and method for efficient development and deployment of manufacturing components. In one aspect, a system includes one or more computers executing computer executable components. The computer executable components include a defect/void filter having executable instructions to receive sensor data employed to produce or inspect a manufactured part. The void filter generates a void data subset by identifying voids that indicate a potential defect in the manufactured part. The void filter assigns void parameters to the identified voids to quantify and qualify the potential defect in the manufactured part. The void filter identifies the voids based on comparing the assigned void parameters of the identified voids to a void defect threshold. The void filter generates a void location tag in the void data subset representing coordinates on the manufactured part where the identified voids exceed the void defect threshold. A stress analyzer having executable instructions processes the void data subset from the void filter and generates stress output data for the respective identified voids in the void data subset. The stress analyzer associates a stored force vector having a force magnitude and direction to the coordinates specified by the void location tag. The force vector models expected stress forces to be applied at the respective coordinates of the manufactured part. The stress output data is generated as force vector and coordinate subsets by the stress analyzer representing the expected stress forces to be applied at the respective coordinates of the identified voids. At least one deterministic model having executable instructions analyzes each of the respective force and coordinate subsets from the stress output data generated by the stress analyzer. The deterministic models determine a curve for each of the respective force and coordinate subsets where the force vector is applied at the associated coordinates over time. The deterministic model generates deterministic output data for each of the respective force and coordinate subsets over a deterministic timeframe representing failure of the manufactured part at the specified coordinates at a given point in time. The deterministic model compares a point on the curve to a failure threshold where failure is predicted for the manufactured part at the specified coordinates based on the applied force vector at the given point in time exceeding the failure threshold. A prognostic analyzer having executable instructions processes the deterministic output data from the deterministic models and generates a failure prediction output for the manufactured part based on computing a collective failure probability from the deterministic output data with respect to the predicted failure of the identified voids over the given timeframe.

In another aspect, a method includes receiving sensor data for a manufactured part to select voids having void parameters and to generate a void data subset. The selected voids indicate a potential defect in the manufactured part and the void parameters quantify and qualify the potential defect in the manufactured part. The method includes comparing the void parameters to a void defect threshold for each of the selected voids and generating a void location tag in the void data subset representing coordinates on the manufactured part where the selected voids exceed the void defect threshold. The method includes generating stress output data for the selected voids in the void data subset and assigning a stored force vector having a force magnitude and direction to the coordinates specified by the void location tag. The force vector models expected stress forces to be applied at the respective coordinates of the manufactured part. The stress output data is generated as force vector and coordinate subsets representing the expected stress forces to be applied at the respective coordinates of the selected voids. The method includes determining a curve for each of the respective force and coordinate subsets in the stress output data where the force vector is applied at the associated coordinates over time. The method includes generating deterministic output data for each of the respective force and coordinate subsets over a deterministic timeframe representing failure of the manufactured part at the specified coordinates at a given point in time based on comparing a point on the curve to a failure threshold where failure is predicted for the manufactured part at the specified coordinates based on the applied force vector at the given point in time exceeding the failure threshold. The method includes generating a failure prediction output for the manufactured part based on computing a collective failure probability from the deterministic output data with respect to the predicted failure of the selected voids over the given timeframe.

In yet another aspect, a non-transitory computer readable medium having computer executable instructions stored thereon. The instructions to process sensor data for a manufactured part, to select voids having void parameters, and to generate a void data subset. The selected voids indicate a potential defect in the manufactured part and the void parameters quantify and qualify the potential defect in the manufactured part. The instructions analyze the void parameters with respect to a void defect threshold for each of the selected voids and generate a void location tag in the void data subset representing coordinates on the manufactured part where the selected voids exceed the void defect threshold. The instructions process the void data subset, generate stress output data for the selected voids in the void data subset, and assign a stored force vector having a force magnitude and direction to the coordinates specified by the void location tag. The stress output data is generated as force vector and coordinate subsets representing the expected stress forces to be applied at the respective coordinates of the selected voids. The instructions determine a curve for each of the respective force and coordinate subsets in the stress output data where the force vector is applied at the associated coordinates over time. The instructions generate deterministic output data for each of the respective force and coordinate subsets over a deterministic timeframe representing failure of the manufactured part at the specified coordinates at a given point in time based on comparing a point on the curve to a failure threshold. Failure is predicted for the manufactured part at the specified coordinates based on the applied force vector at the given point in time exceeding the failure threshold. The instructions generate a failure prediction output for the manufactured part based on computing a collective failure probability from the deterministic output data with respect to the predicted failure of each of the selected voids over the given timeframe.

DETAILED DESCRIPTION

Figure 1:
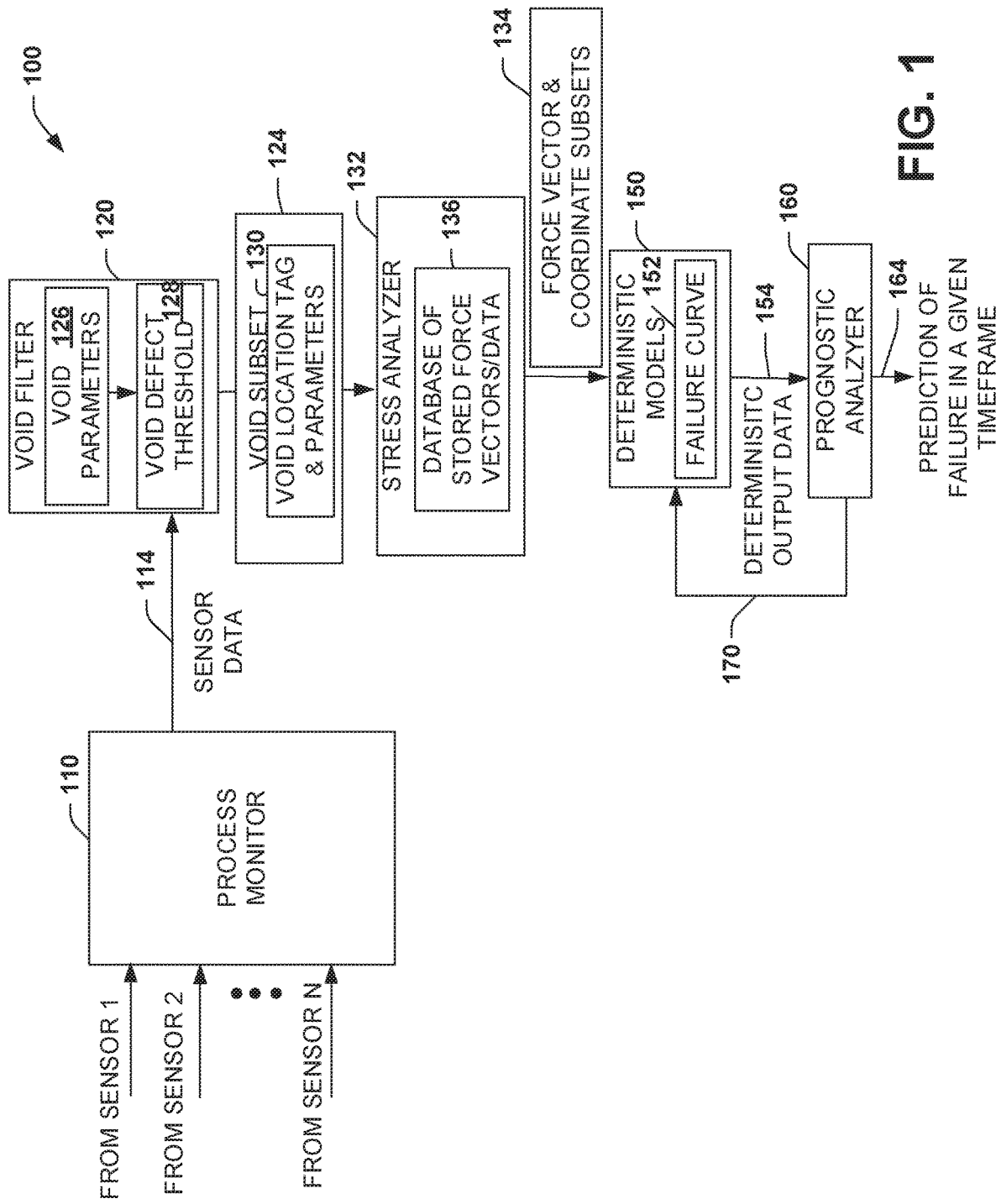
FIG. 1 illustrates a block diagram of an example a prognostic qualification system for development and deployment of manufacturing parts.

This disclosure relates to a prognostic qualification system and method for rapid development and deployment of manufacturing components. Additive manufacturing (AM) parts such as those produced from 3-D printing (e.g., any layered/rapid manufacturing process) allows new parts to be developed in a much more rapid manner than traditional manufacturing techniques. As such, if traditional testing/validation approaches were applied to these AM parts, the part could be produced in a matter of minutes or hours yet subject to the conventional testing paradigm of vigorous and repeated testing. Such a process could take years to get to an end-product state, based on the amount of desired testing and thus substantially reduce the efficacy of AM process technology. The prognostic qualification systems and methods disclosed herein provide an automated, analytical, and deterministic framework to rapidly qualify a part based on automated defect characterization of voids which are porous (or scratched/nicked/indented) structures within a given part/material that can limit the usefulness and/or reliability of the material.

Thus, voids have been identified as one of the issues in the AM process, creating doubt in the quality of parts constructed with this process. The prognostic qualification system employs a void filter (e.g., defect detection component) in conjunction with sensors for process monitoring of a given AM part while being manufactured to determine the level and location of damaging conditions such as voids that may affect the future reliability of the part. Output from the void filter can be processed by a stress analyzer that receives a void data subset from the void filter and determines coordinate data (e.g., where a potential defect on a given part is located) and force data applied to model the respective detected voids in the manufactured part. The coordinate data can be determined as a coordinate location on the manufactured part where the respective void was detected and a stress analyzer can apply force data as a direction and magnitude (e.g., force vector or vectors) that force is expected to be applied at the coordinate location where the respective void was detected.

After voids have been identified along with their coordinates on a given part with respect to the applied forces modeled at the respective locations by the stress analyzer, deterministic models can be run for each void identified by the void filter and stress forces applied by the stress analyzer. Output from the deterministic models can be coupled with a prognostic analyzer (e.g., learning models) to generate a probabilistic distribution from the collective output of the deterministic models. The probabilistic distribution derived from analyzing the deterministic models' output can then predict static capability and remaining useful life (RUL) with the as-manufactured identified/modeled void conditions of the AM part. As the automated analysis proceeds, positive margins on structural capabilities and part life allow for the reduction of non-threatening conditions (e.g., removing unlikely conditions from the deterministic models that may not come into play) resulting in a reduction in uncertainty and raised confidence in part quality going forward. The prognostic systems and methods disclosed herein can thus reduce barriers (e.g., cost, schedule, and technical risk) to qualifying/validating new advanced manufacturing processes and parts, while also automatically quantifying the level of risk and expediting regulatory acceptance of the parts that are produced by the process.

The prognostic system and methods are also capable of automatically determining and accurately managing uncertainty of the components made by new manufacturing techniques such as AM to enable systems to measure the risk of incorporating these new technologies (e.g., into an advanced aircraft without years of testing before installation). This facilitates the capability of the structures/components manufactured at the extremes of the manufacturing environment (e.g., the "corners of the process envelope") can be accurately and predictably accounted for. Hence, understanding the process capability and the effect of low probability process events on the performance of the end product can be captured, modeled, and used to rapidly introduce a new AM part while bypassing years of conventional testing while managing acceptable risks.

In one example, the prognostic systems and methods described herein qualify and certify an advanced manufacturing part with reduced time and cost compared with those typically incurred during the conventional "building block, massive testing" approach with the added benefit of quantifying an uncertainty parameter of the component (e.g., number/size/shape/density of voids). A combination of targeted testing can be employed to analyze and determine the nature of voids in a given process, material/structural model, advanced state awareness, where prognostic modeling provides a base for automated analysis and qualification of a given part in an efficient timeframe for deployment after production.

Output from the prognostic qualification system can be fed to another analytical system such as a concurrent uncertainty management system to further analyze overall product lifetime. Output from the concurrent uncertainty management system can also be fed-back to further refine the models of the prognostic system after the given products are installed and monitored for real-time and on-going feedback. Furthermore, the prognostic system and methods disclosed herein enable integration and collaboration between sensor systems, employed during manufacturing and usage, advanced reasoning models and methods, for data fusion and signal interpretation, while also incorporating advanced modeling and simulation tools to continually refine the accuracy and deployment of rapidly manufactured parts.

FIG. 1 illustrates an example prognostic qualification system 100 for development and deployment of manufacturing parts. The system 100 includes one or more computers, processors, or central processing units (CPUs) (not shown) executing computer executable components, where the computer executable components include various components of the system and are illustrated and described below with respect to FIGS. 1-8. A process monitor 110 includes an executable instruction to facilitate monitoring a plurality of sensors shown as sensor 1 though N, with N being a positive integer. The process monitor 110 generates sensor data 114 which describes various process parameters during production of a given part (e.g., Advance Manufacturing part such as from 3-D printing or other layered process). These process parameters can include head speeds as printing is applied, nozzle velocities, temperatures, accelerations experienced by a given part, humidity, and so forth. The plurality of sensors 1-N are coupled to a machine (not shown) to produce the manufactured part or to a process variable affecting quality of the manufactured part as it is respectively produced.

The sensors 1-N can include at least one of a voltage sensor, a current sensor, a power sensor, a position sensor, a velocity sensor, an accelerometer, a strain gauge, a surface quality sensor, a camera sensor, an x-ray sensor, and a microscope sensor, for example. Each of the sensors 1-N can be employed to inspect and/or identify defect parameters of a given manufactured part. A void filter 120 having executable instructions receives the sensor data 114 employed to produce or inspect a manufactured part. The void filter 120 generates a void data subset 124 by identifying voids that indicate a potential defect in the manufactured part. As used herein, the term void can refer to a porous structure containing an entrapped area of microbubbles or a single entrapped bubble, can be more consequential in nature such as a continuous hole through the part or can be a surface defect on one portion or another (e.g., scratch, dent, or nick) in the part such as an indentation on a given surface of the part being manufactured.

The void filter 120 assigns void parameters 126 to the identified voids to quantify and qualify the potential defect (or defects) in the manufactured part. The void filter 120 identifies the voids based on comparing the assigned void parameters 126 of the identified voids to a void defect threshold 128. For example, if a potential void is detected by the void filter 120 that may potentially cause some type of failure in a given part, the void parameter 126 may specify a given radius (if a circular void detected) or area (if rectangular void detected) that if such radius or area void parameter exceeds a predetermined radius or area void defect threshold 128, the potential void can be flagged for further downstream processing as described herein to analyze the severity of the void and accordingly the void's respective impact on the structural performance of the part in question. The void filter 120 also generates a void location tag 130 in the void data subset 124 representing coordinates (e.g., X, Y, Z coordinates, or angular coordinates) on the manufactured part where the identified voids exceed the void defect threshold 128.

A stress analyzer 130 having executable instructions processes the void data subset 124 from the void filter 120 and generates stress output data for the respective identified voids in the void data subset. The stress analyzer 130 associates a stored force vector having a force magnitude and direction to the coordinates specified by the void location tag 130. The force vector models expected stress forces to be applied at the respective coordinates of the manufactured part. The stress output data is generated as force vector and coordinate subsets 134 by the stress analyzer 132 representing the expected stress forces to be applied at the respective coordinates of the identified voids. A database 136 (e.g., non-volatile memory storage, hard drive, read only memory integrated circuit or bubble memory) can be employed to store force equations and expected forces (e.g., force vectors) that may be applied to any portion of a manufactured part, where each, for each void location identified by the void location tag 130.

Location information specified by the void location tag 136 is determined as a coordinate location on the manufactured part (e.g., 1.00 inch from top corner of part, angular distance from a corner of a part) where the respective void was detected and, where the force data (e.g., equations and data specifying the amount of force to be directed at a given location of a manufactured part) is determined as a direction and magnitude that is applied at the coordinate location where the respective void was detected. The coordinate data can be provided by the void filter 120 via the void location tag 130 and generated by locating and defining where on a given part a void was detected based on the sensor data 114. The force data can be provided by force models (e.g., physical models and equations describing force directions applied at a given location/coordinate of the part) and based on projected force vectors that the force data may be applied at the identified void location/coordinate. Thus, the stress analyzer 132 can include a set of models, equations, and data that describe substantially all known forces that may be expected to be applied to a given part when under use. This can include a singular force vector having a magnitude and direction that describes the sum of all forces and magnitudes applied at a given coordinate location. The output 134 from the stress analyzer 132 thus includes force indications that are determined from models and are applied at the identified void locations in the void data subset 124.

At least one deterministic model 150 (or models) having executable instructions analyzes each of the respective force and coordinate subsets 134 from the stress analyzer 132. The deterministic models determine a curve 152 (or computed graph) for each of the respective force and coordinate subsets 134 where the force vector is applied at the associated coordinates over time. The deterministic model 150 generates deterministic output data 154 for each of the respective force and coordinate subsets 134 over a deterministic timeframe representing failure of the as manufactured part at the specified coordinates at a given point in time. The deterministic model 150 compares a point on the curve to a failure threshold where failure is predicted for the part at the specified coordinates based on the applied force vector at the given point in time exceeding the failure threshold. For instance, if 100 voids are detected in the given manufactured part, the deterministic model 150 can generate 100 separate outputs (if relevant, based on stress analysis and void coordinates) analyzing each void's propensity for failure given a force, and over the course of time.

A prognostic analyzer 160 having executable instructions processes the deterministic output data 154 from the deterministic models 150 and generates a failure prediction output 164 for the as manufactured part based on computing a collective failure probability from the deterministic output data 154 with respect to the predicted failure of the identified voids over the given timeframe. The failure prediction output 164 can be expressed as a probability (e.g. based on learning models) that describe an overall distribution (e.g., bell curve) for the remaining useful life of the manufactured part and its respective probability of failure within a given timeframe. Feedback 170 can be provided from the prognostic analyzer 160 back to the deterministic models 150 as components are further analyzed and/or deployed for use. Thus, the feedback 170 may indicate some of the previous model assumptions did not (or were unlikely to) occur and thus the earlier upstream models can be refined to tighten the overall prediction output at 164 (e.g., decrease the standard deviation in the output). Further illustration and description of the system 100 are provided in FIGS. 2-7 below.

Figure 2:
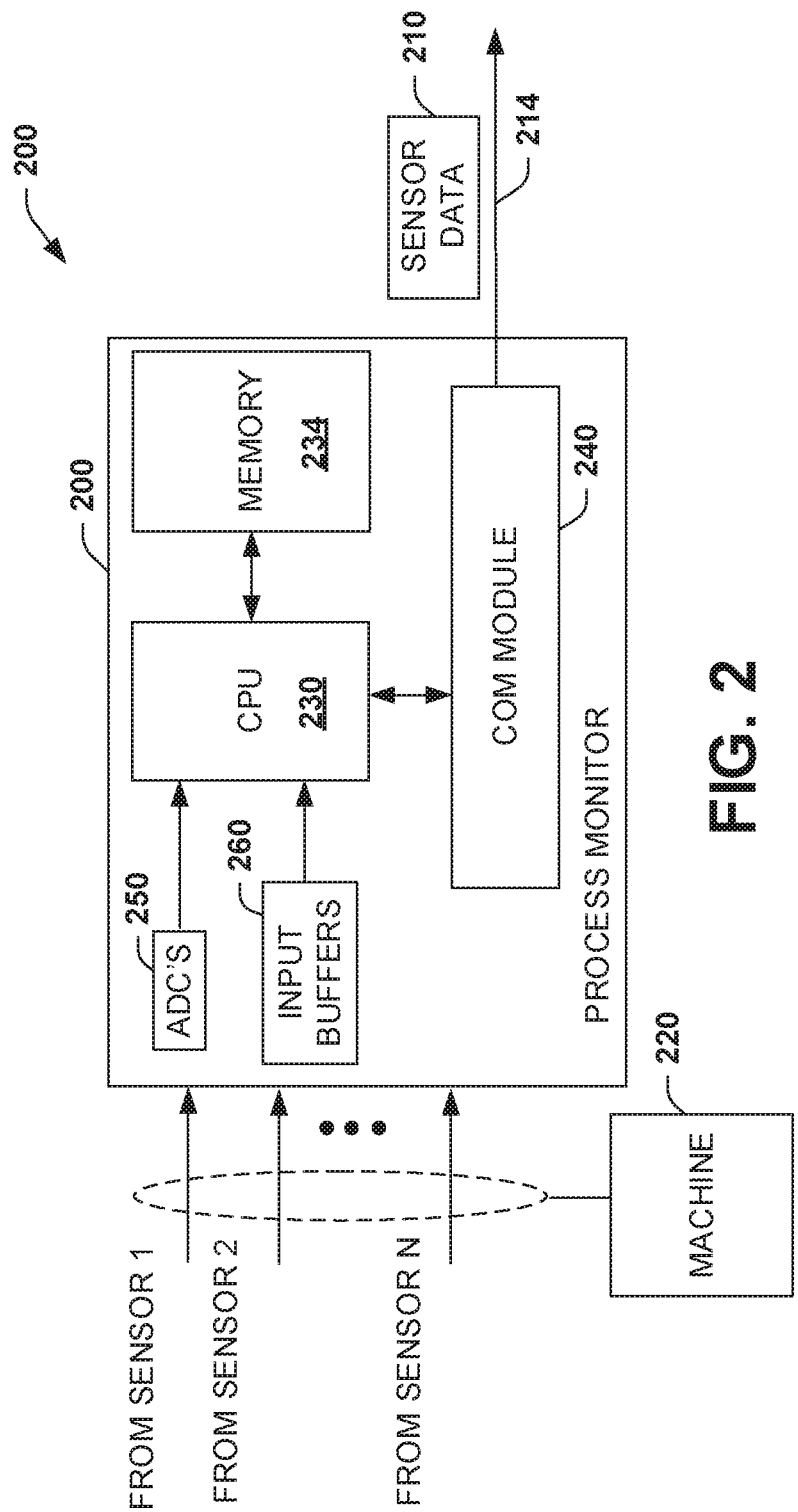
FIG. 2 illustrates an example of a process monitor for a prognostic qualification system.

FIG. 2 illustrates an example of a process monitor 200 for a prognostic qualification system such as illustrated in FIG. 1 (e.g., process monitor 110). The process monitor 200 includes executable instructions that monitor a plurality of sensors 1-N to generate sensor data 210 at output port 212. The sensor data 210 indicates various parameters including process parameters (e.g., print head speed, temperature) and can include inspection parameters such as received from a digital camera capturing voids in the manufactured part by a machine 220. A central processing unit (CPU) 230 executes executable instructions from memory 234 to provide the various functions described herein for the process monitor 200. A communications module 240 (COM) operated by the CPU 230 provides an interface for the process monitor 200 to transmit the sensor data 210 to an external module such as the void filter 120 of FIG. 1. The communications module 240 can provide wired and/or wireless communications capability to communicate with the void filter. Subsequently, any type of communications protocol can be employed such as Ethernet. Internet access to the process monitor 200 is also supported by the communications module 240.

As noted above, the plurality of sensors 1-N can be coupled to the machine 220 during part production. The sensor monitoring can include monitoring process variables affecting quality of the manufactured part which can include automated part inspection data and/or machine parameters sensed while manufacturing the respective part. Machine parameter sensors can include at least one of a voltage sensor, a current sensor, a power sensor, a position sensor, a velocity sensor, an accelerometer, and a strain gauge, for example. Inspection sensors for detecting voids in a part can include a surface quality sensor, a camera sensor, an x-ray sensor, and a microscope sensor, for example. In addition to executable instructions, the memory 234 can include random memory to store the sensor data described herein. The process monitor 200 includes at least one analog-to-digital converter (ADC) 250 to convert received analog sensor signals (e.g., voltage, current, pressure) to the sensor data. Also, for digital sensor data received from devices such as inspection cameras, for example, one or more input buffers 260 can be provided to capture such data and provide it to the CPU 230 for further processing and/or transmittal to the void filters described herein.

Figure 3:
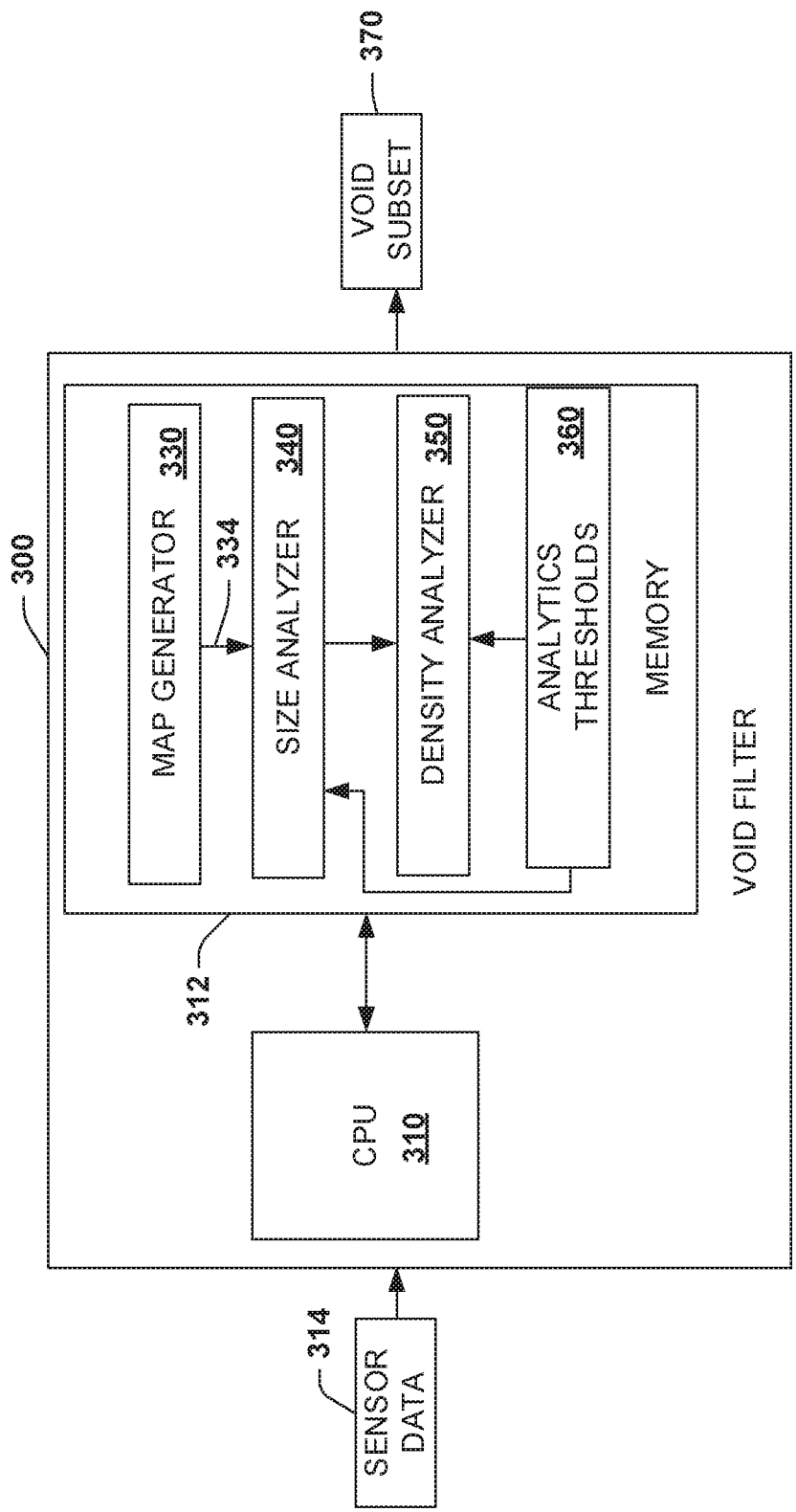
FIG. 3 illustrates an example of a void filter for a prognostic qualification system.

FIG. 3 illustrates an example of a void filter 300 for a prognostic qualification system such as shown in FIG. 1. The void filter 300 operates similarly to the void filter 120 described above with respect to FIG. 1. The void filter 300 includes a CPU 310 operable with a memory 312 having executable instructions to enable selection and/or identification of voids from sensor data 314 (e.g., sensor data 114 of FIG. 1, and sensor data 210 of FIG. 2), where the void selection indicates voids that may affect reliability of a given manufactured part. The executable instructions in the memory 312 include a map generator 330 that generates location coordinates at 334 indicating a location for the respective detected voids from the sensor data 314 with respect to a correlated position on a surface coordinate of the manufactured part. For instance, on a rectangular part, a coordinate may be specified as an X and Y location on the part where a given void is located. For spherical, cylindrical, or other shapes, the map generator may specify the void locations in other coordinate systems such as angular coordinates (e.g., radius of circle/sphere and angle of radius).

The executable instructions in the memory 312 can also include a size analyzer 340 to determine an area value for the respective detected voids. For instance, if the shape of a detected void is circular, the area value may be expressed as $pi*r^2$ where r represents the radius for the detected void. The executable instructions in the memory 320 can also include a density analyzer 350 to determine a density value for a cluster of voids detected within a predetermined region of the manufactured part. For example, a given cluster of detected voids may each individually fall below a given threshold as a reliability issue but since the number of voids within a given area are clustered together in a small region, the cluster (e.g., as defined by an analytics measurement circle or square outlining the region) may indicate a reliability issue due to the number of voids detected in the small confines of the region.

As shown, various analytic thresholds 360 can be stored in the memory 312 to facilitate identifying individual voids and/or clusters of voids that may be problematic, where such identified voids are indicated in a void data subset 370 (e.g., similar to the void subset 124 of FIG. 1). Thus, the void filter 300 includes executable instructions to select the respective detected voids in the void data subset 370 by comparing the area value from the size analyzer 340 to a predetermined area threshold and selecting voids that are greater in size than specified by the area threshold. This can also include comparing the density value for the cluster of voids determined by the density analyzer 350 to a cluster region threshold and selecting void clusters that are greater in size than specified by the cluster region threshold.

Figure 4:
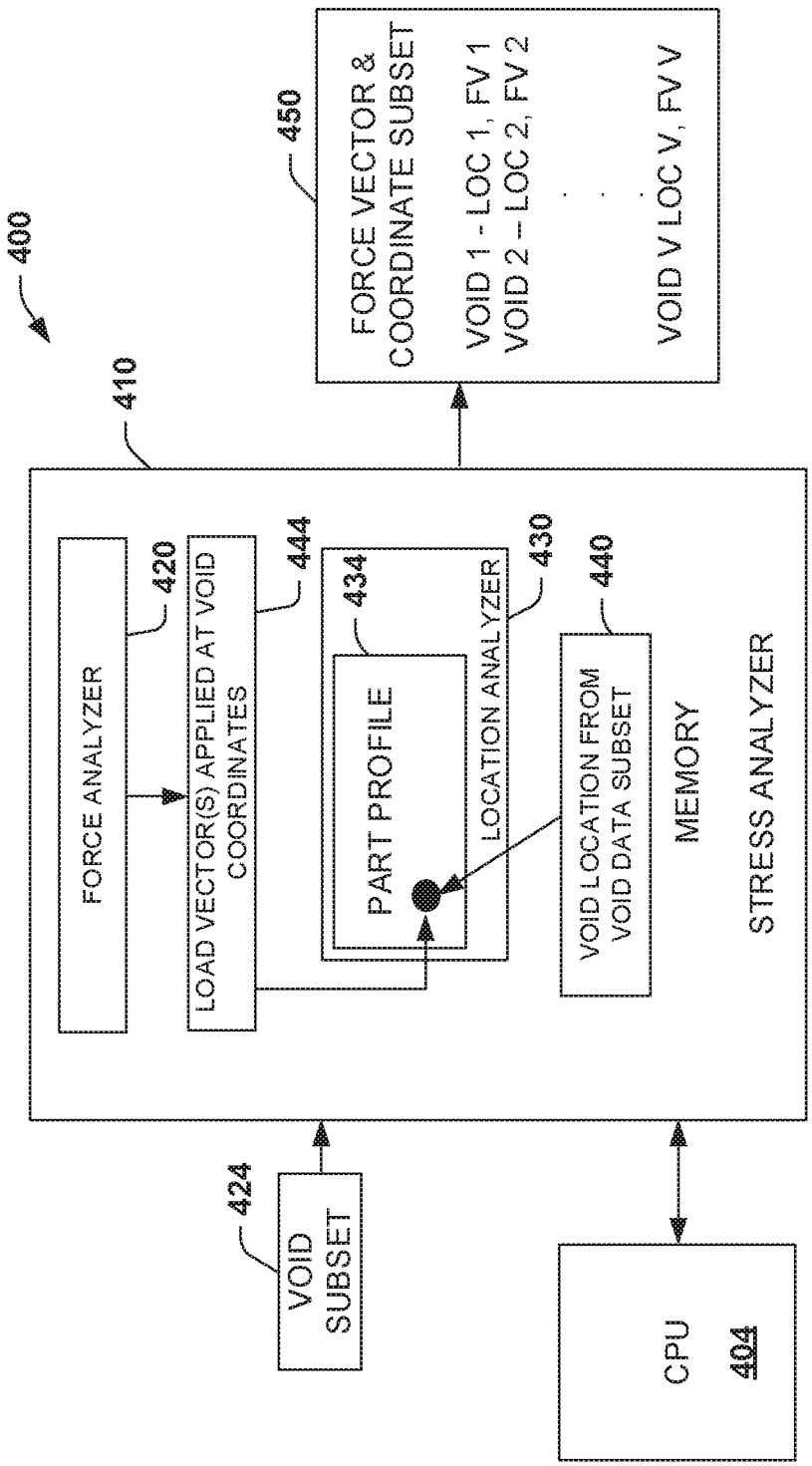
FIG. 4 illustrates an example of a stress analyzer for a prognostic qualification system.

FIG. 4 illustrates an example of a stress analyzer 400 for a prognostic qualification system. The stress analyzer 400 is similar to the stress analyzer 130 described above with respect to FIG. 1. The stress analyzer 400 includes a CPU 404 that executes from a memory 410 that includes a force analyzer 420 to perform the functions of applying forces at void coordinates determined from the void filter 120 of FIG. 1 and the void filter 200 of FIG. 2. The force analyzer 420 apples at least one force vector (e.g., from predetermined force equations described below) specifying a force magnitude and force direction to the respective voids selected in a void data subset 424 (e.g., received from 124 of FIG. 1 or 370 of FIG. 3). The stress analyzer 410 includes a location analyzer 430 to process the coordinate and void parameter data (e.g., from 334 of FIG. 3) from the void filter and received in the void data subset 424. The location analyzer 430 associates at least one force vector with the void coordinates specified in the void data subset 424. This association is shown in a part profile 434, where an identified void location 440 has an applied load vector 444 generated from the force analyzer 420. The location analyzer 430 also generates a force vector and coordinate subset 450 indicating applied force vectors at the identified void locations. Thus, each identified void (or void cluster) can be associated with one or more force vectors in force vector and coordinate subset 450 and is shown as an identified location for a void in coordinates having an associated force vector (FV).

The force analyzer 420 can include physics-based models to identify pertinent cause and effect relationships based on given loads expected to be applied to a given part and the associated random variables, their interdependencies, and their relative influence on quantities of interest. Physics-based models represent the interaction between concurrent failure modes. High-fidelity modeling can be based on experimental characterization of the pertinent microstructures, where model predictions can be continually verified with focused experiments and or capture of real time data that supports or modifies a given model.

Figure 5:
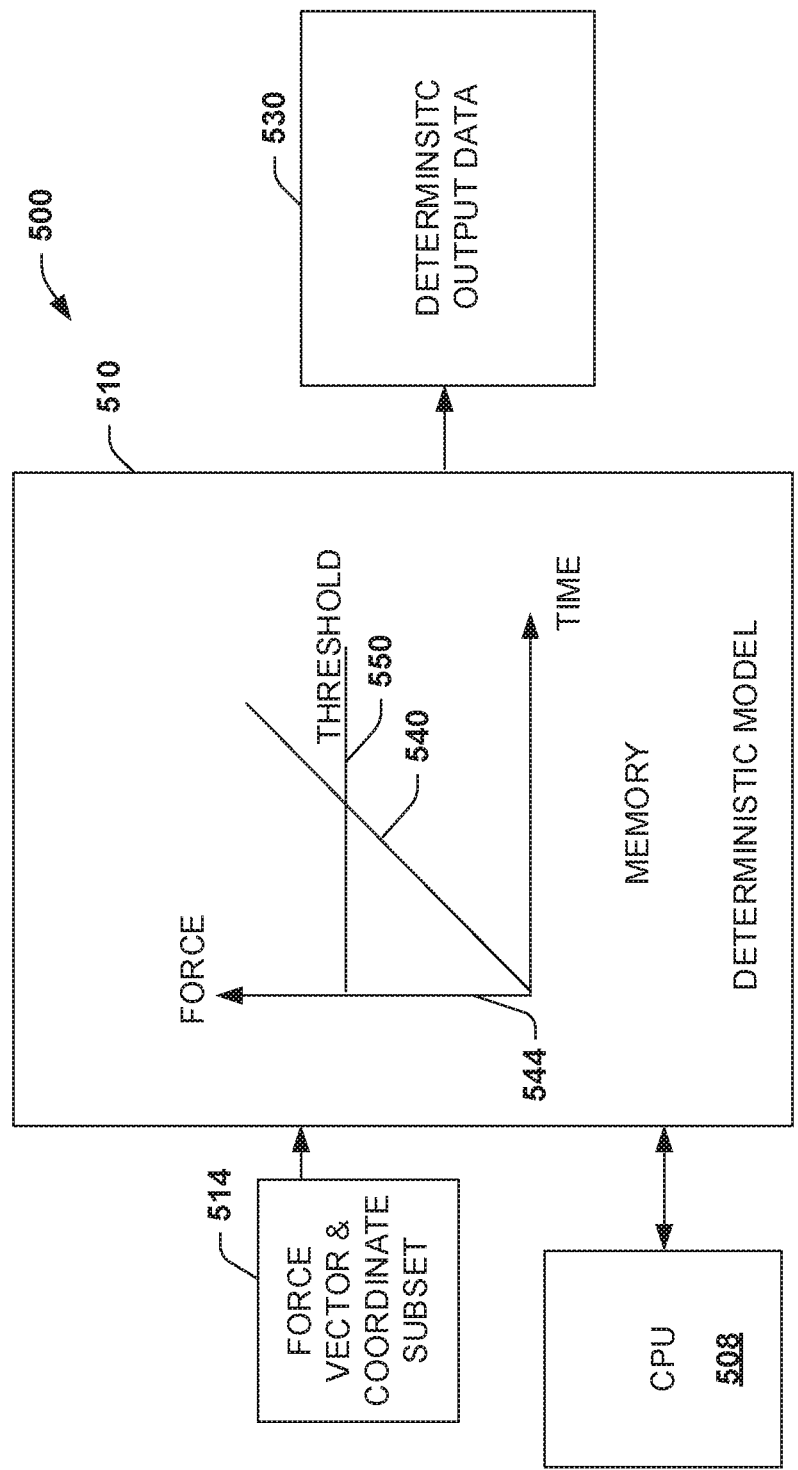
FIG. 5 illustrates an example of a deterministic model for a prognostic qualification system.

FIG. 5 illustrates an example of a deterministic model 500 for a prognostic qualification system such as shown in FIG. 1. The deterministic model (or models) includes instructions that are executable by a CPU 504 from a memory 510. The deterministic model 510 receives input from a force vector and coordinate subset 514 which is generated by the stress analyzer at 450 of FIG. 4. The deterministic model executable instructions in the memory 510 process force data from the force vector and coordinate subset 514 and generate deterministic output data 530 based on a force/time analysis at 544. The deterministic output data 530 that indicates failure over a deterministic timeframe by generating a curve 540 of the force vector (shown on the vertical axis) at the respective void coordinates with respect to time (shown on the horizontal axis). Failure for a given void identified in the force vector and coordinate subset 514 can be determined by setting a point on the curve to a predetermined failure threshold 550 and detecting where the curve 540 intersects the threshold. Deterministic output data 530 can be generated for each void (or cluster of voids) identified in the force vector and coordinate subset 514.

The deterministic model executed from the memory 510 can also produce a state space trajectory of defect size as a function of time/usage. Typically, such models involve an initial state (usually an initial flaw size), an assortment of model parameters (stress intensity factors and so forth) and usage (usually stress history) as inputs, and produce a deterministic trace of defect size evolution as a function of past and anticipated usage as deterministic output 530. Subsequently, any of the input variables can take on random values as characterized by probability distribution functions. Each input distribution can (optionally) be characterized by hyper-parameter distributions that can be refined through Bayesian learning described below with respect to FIG. 6.

Figure 6:
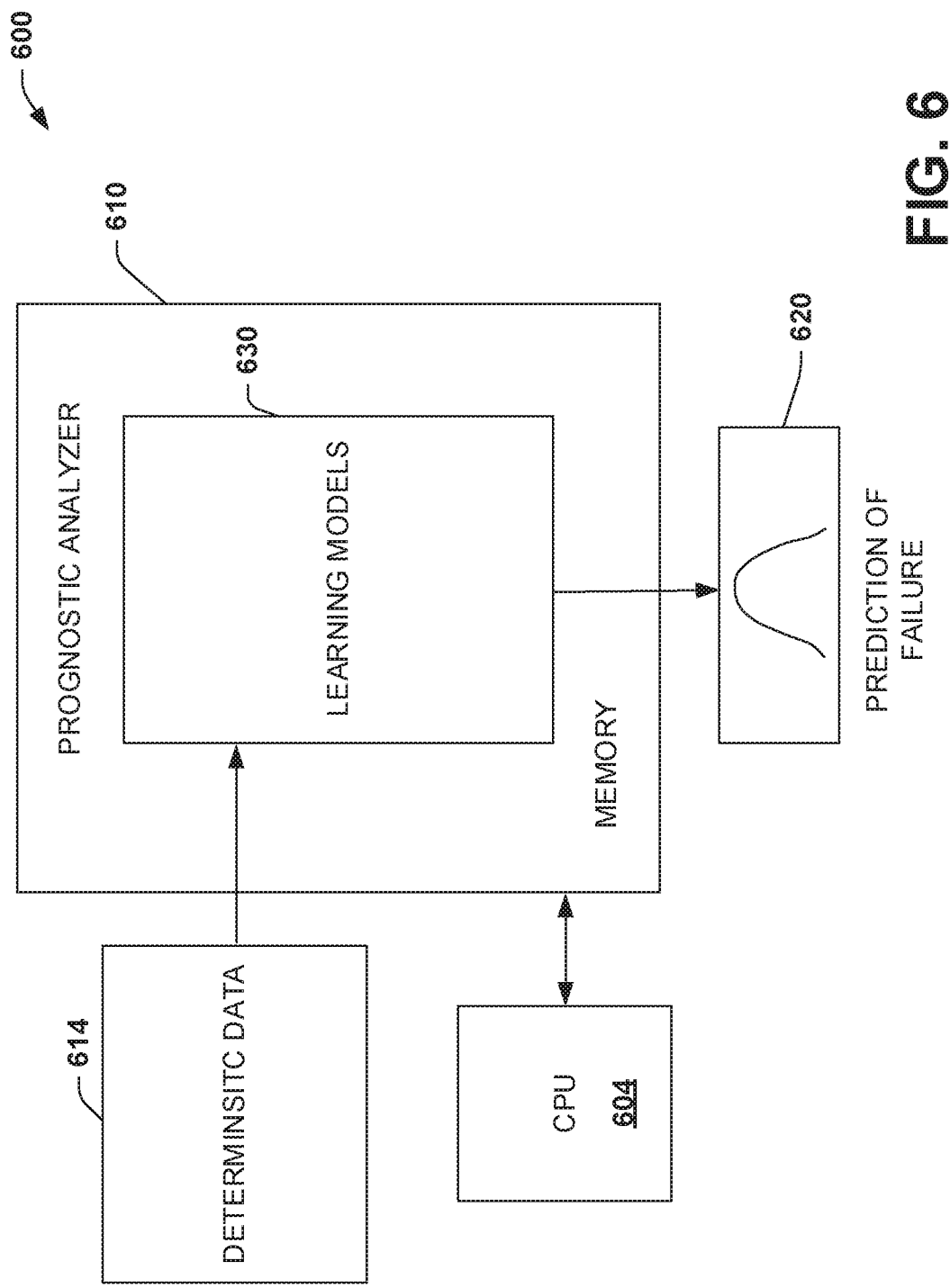
FIG. 6 illustrates an example of a prognostic model for a prognostic qualification system.

FIG. 6 illustrates an example of a prognostic analyzer 600 for a prognostic qualification system such as shown above with respect to 160 of FIG. 1. A CPU 604 executes executable instructions from a memory 610 which performs the functions of the prognostic analyzers described herein. The prognostic analyzer receives deterministic data 614 which can be received from 154 of FIGS. 1 and 530 of FIG. 5. The prognostic analyzer executing from the memory 610 determines a collective failure probability at 620 by analyzing an overall probability for a given manufactured part based on the collection of respective voids from the deterministic data 614 to generate a likelihood of failure at a time before the failure in the deterministic timeframe to predict a minimum time that the failure is not likely to occur. At least one learning model 630 can be executed to generate the likelihood of failure within a given timeframe at 620 based on a statistical determination of the learning model. The learning model 630 can, for example, include a classifier (e.g., support vector machine) or a neural network to perform the statistical determination. As shown, the prediction of failure at 620 can be a bell curve prediction which provides standard deviations representing failure times from a central point on the curve.

Other probabilistic reasoning methods can be employed in the prognostic analyzer 610 to minimize data needed to account for uncertainties. To capture variability inherent in part attributes such as performance and reliability, physics-based models can be employed at the stress analyzer (e.g., 410 of FIG. 4, 130 of FIG. 1) to identify pertinent cause and effect relationships and the associated random variables, their interdependencies, and their relative influence on qualitative and quantitative quantities of interest. Physics-based models represent the interaction between concurrent failure modes for a given manufactured part and its respective deployment conditions. High-fidelity modeling can be based on experimental characterization of the pertinent microstructures (e.g., voids), where model predictions can be continually verified with focused/limited experiments. A common uncertainty format (e.g., tagged identifiers) for statistically representative, digital, microstructure definitions enables rapid and accurate correlation between the various models. Probabilistic methods can also be employed to account for stochastic behavior and for materials variability. Reduced-order (meta-) models can be developed for field use. These surrogate models can be updated more frequently as damage progresses and the standards (e.g., thresholds) for uncertainty become more stringent.

The learning models 630 can include a dynamic Bayesian belief network, for example, and can be overlaid on the cause-and-effect part structure (represented in the maps described herein) to propagate dominant uncertainties related to reliability and failure under load from their sources to part parameters of interest. Random variable distributions represented at nodes in the network and their associated hyper-parameters can be updated using Bayesian learning methods, or other learning systems such as neural networks. A generalized version of probability distribution mapping can be used to propagate the effects of low-probability events (e.g., even though a failure is predicted for a given void or set of voids, failure is not expected/predicted within a timeframe for which the manufactured part is expected to be deployed).

In general, the prognostic analyzer executed from the memory 610 can receive any deterministic model output 614 that produces a state space trajectory of defect size as a function of time/usage. Typically, such models involve an initial state (usually an initial flaw size), an assortment of model parameters (stress intensity factors and so forth) and usage (usually stress history) as inputs, and produce a deterministic trace of defect size evolution as a function of past and anticipated usage as an output. Any of the input variables can take on random values as characterized by probability distribution functions. Each input distribution can (optionally) be characterized by hyper-parameter distributions that can be refined through Bayesian learning (or other learning algorithms) of the learning models 630.

For example, data can be gathered from the void data subset and maps described herein regarding an input flawsize distribution that is best characterized as a two-parameter Weibull distribution. For instance, different parts may show different values for these two parameters. Consequently, each of the two parameters may also be treated as random variables that may in turn be characterized by their own distributions (that may be jointly distributed). The learning models 630 can include a Bayesian learning process that uses data, produced by laboratory experiments or fleet findings related to a given part, to adjust the hyper-parameters that in turn improve input distributions for the respective models.

Figure 7:
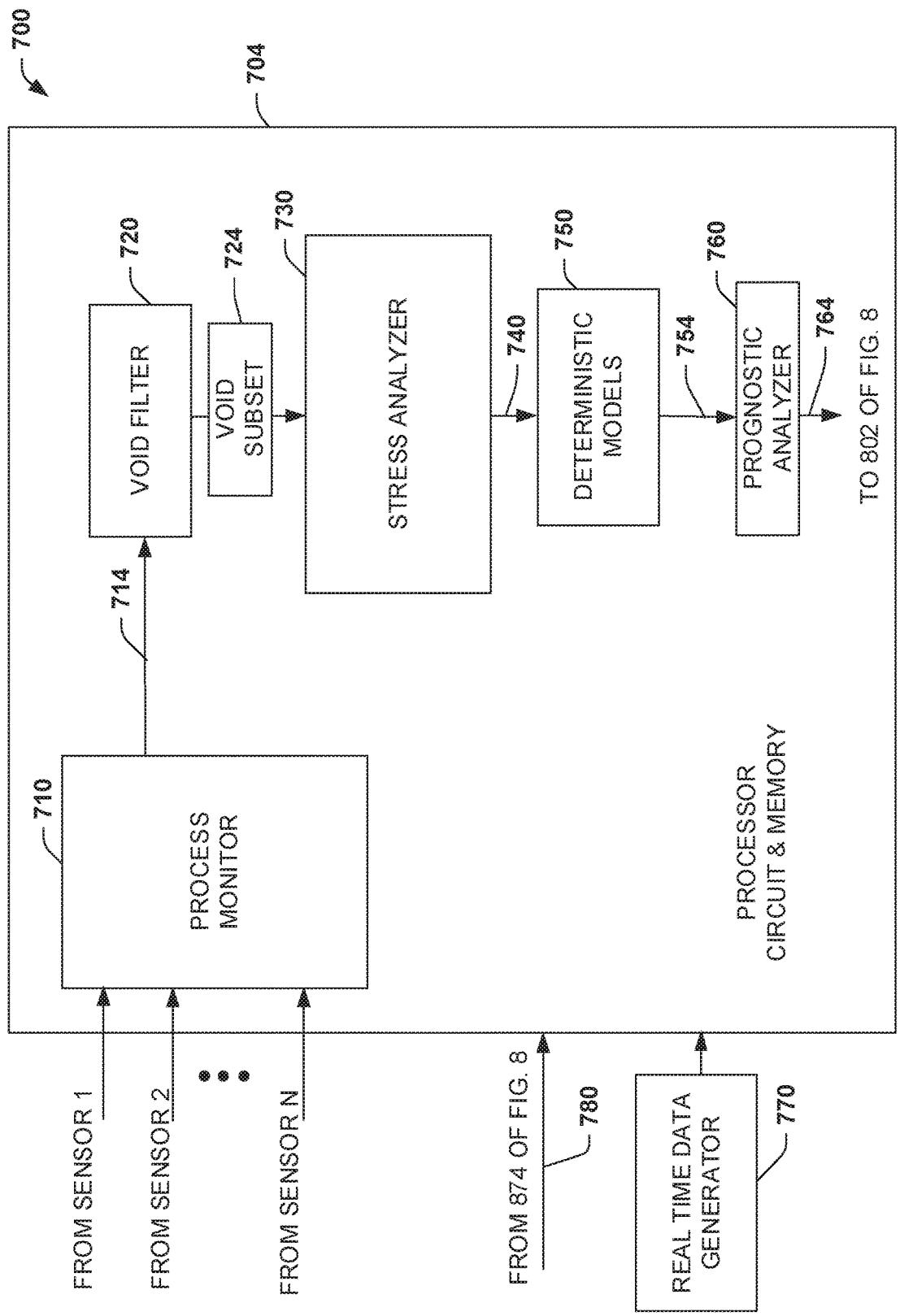
FIG. 7 illustrates an example of a prognostic qualification system that receives real-time data or probabilistic data from outside systems to update models of the system.

FIG. 7 illustrates an example of a prognostic qualification system 700 that receives real-time data or probabilistic data from outside systems to update models of the system. The system 700 is similar to the system 100 of FIG. 1 but is also coupled to one or more real-time systems or other uncertainty systems (see e.g., FIG. 1) to affect operations of the respective systems and/or receive input from those systems to refine the system 700. As shown, a processor circuit and memory 704 are provided to execute the various executable blocks described herein. Similar to the system 100 described above with respect to FIG. 1, the system 700 includes a process monitor 710 that monitors a plurality of sensors shown as sensor 1 though N, with N being a positive integer. The process monitor 710 generates sensor data 714 which describes various process parameters during production of a given part. As noted previously, the sensors 1-N include at least one of a voltage sensor, a current sensor, a power sensor, a position sensor, a velocity sensor, an accelerometer, a strain gauge, a surface quality sensor, a camera sensor, an x-ray sensor, and a microscope sensor, as examples.

A void filter 720 receives the sensor data 714 employed to produce or inspect a manufactured part. The void filter 720 generates a void data subset 724 indicating voids detected in the manufactured part. The voids indicate a potential defect in the manufactured part. A stress analyzer 730 processes the void data subset 724 from the void filter 720 and determines coordinate data and force data shown at 740 for the respective detected voids in the manufactured part from the filter. The coordinate data is determined as a coordinate location on the manufactured part the respective void was detected and the force data is determined as a direction that force is applied at the coordinate location the respective void was detected. The stress analyzer 730 can include a set of models and equations that described substantially all known forces that may be applied to a given part when under use. The output 740 from the stress analyzer 730 thus includes force indications that are determined from models and are applied at the identified void locations in the void data subset 724.

A deterministic model 750 analyzes the coordinate data and the force data 740 from the stress analyzer 730 for the respective detected voids from the void data subset 724. The deterministic model 750 analyzes failure of the respective detected void with respect to time (e.g., force applied over time) and generates deterministic output data 754 indicating failure over a deterministic timeframe of the respective detected voids. For instance, if 70 voids are detected in the given manufactured part, the deterministic model 750 can generate 70 separate outputs analyzing each voids propensity for failure given a force and over the course of time.

A prognostic analyzer 760 processes the deterministic output data 754 from the deterministic model 750 and generates a failure prediction output 764 for the manufactured part based on computing a collective failure probability with respect to the detected voids over a given timeframe. The failure prediction output 764 can be expressed as a probability (e.g. based on learning models) that describe an overall distribution (e.g., bell curve) for the remaining useful life of the manufactured part and its respective probability of failure within a given timeframe. As shown, the prediction output 764 can be provided to another automated analytical system such as illustrated and described with respect to FIG. 8.

A real time data generator 770 can update at least one of the void filter 720, stress analyzer 730, deterministic model 750, and/or the prognostic model 760 based on vehicle data received from the real time data generator, where the vehicle data is collected from an aircraft (e.g., flight data recorder), a helicopter, a land vehicle, a ship, a space craft, a satellite, or a drone. For instance, as actual stresses on a given part are analyzed over time (e.g., via a flight data recorder), the real time data generator 770 can provide such data to further refine the models and/or estimates in the system 700. Also, product life estimate output from the system 800 of FIG. 8 (e.g., at 874) can be received at 780 to further update/refine the models and estimates of the system 700.

Figure 8:
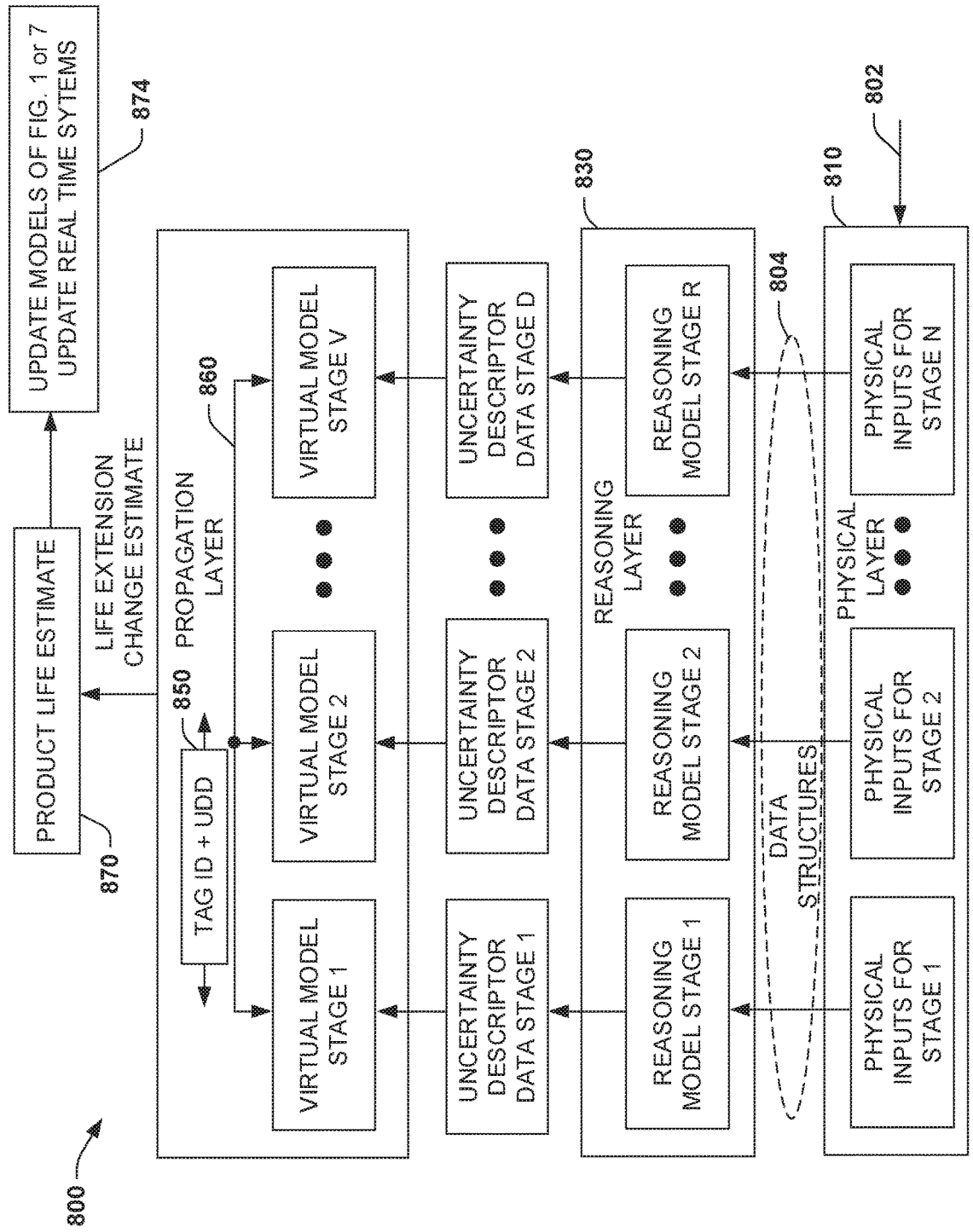
FIG. 8 illustrates a block diagram of an example of a concurrent uncertainty management system where uncertainty data is processed at each stage of a product lifecycle and can be employed to receive prognostic data from the system of FIGS. 1 and 7, while updating the models of the system based on the received data.

FIG. 8 illustrates an example of a concurrent uncertainty management system 800 where uncertainty data is processed at each stage of a product lifecycle and can be employed to receive prognostic output data from the systems of FIGS. 1 and 7 (e.g., from output 164 and 764 respectively) and update the models of the respective systems based on the received data. The concurrent uncertainty management system 800 receives the failure prediction output at 802 from a prognostic model to determine a product life estimate 870 based on processing the failure prediction output, and update at least one of the void filter, the stress analyzer, the deterministic model, and the prognostic model based on output 874 that is based on the processing. The output 874 can also be sent to real-time systems such as aircraft to automatically affect operations of the aircraft (e.g., cause flight correction, return-to-base command) based on the collective failure prediction processing of the systems 100, 700, and/or 800 described herein.

The system 800 includes a physical layer 810 that aggregates the input 802, data structures 804 from a plurality of physical inputs shown as physical inputs for stage 1, stage 2, and stage N, where N is a positive integer. As used herein, a layer refers to a processing level where computer executable instructions are executed by a processor to perform the tasks of the layer. The physical inputs 810 define product materials, models, assembly materials, practices and procedures, and use (e.g., feedback from flight data recorders and sensors) that are converted to the plurality of data structures 804 for each of a plurality of product stages. The data structures 804 provide a digital capture of data relating to sensed or logged deviations in components, assemblies, manufacturing deviations, product usage deviations, and so forth, all which can contribute to lifecycle uncertainties as described herein. Each stage in the plurality of product stages contributes to define an operational lifetime of a product, where the product operational lifetime includes a design stage, a manufacturing stage, and a sustainment stage, for example.

A reasoning model layer 830 includes reasoning models 1 though R, with R being a positive integer. The reasoning model layer 830 processes the data structures 804 for the respective products stages to determine uncertainty descriptor data (UDD) for each product stage shown as UDD 1 though D, with D being a positive integer. The UDD defines an uncertainty probability estimate for each of the physical inputs 810 in the plurality of data structures 804. The uncertainty probability estimate relates to the probability of error or deviation within each stage of the product lifetime. As used herein, the term product can refer to a component, an assembly, a sub-assembly, and so forth that contribute to collectively perform functions of the product which can include vehicles, aircraft, electronic products, and so forth.

In one example, if a component is substituted in manufacturing and has a different tolerance from that which was originally specified at design, a deviation report can be generated and a data structure 804 populated, where the reasoning model layer 830 can determine a probability estimate in the form of the UDD. A propagation layer 840 employs a plurality of virtual models shown as 1 through V, with V being a positive integer, that electronically (e.g., digital models of materials, assemblies, or systems) describe each stage in the plurality of product stages in view of the UDD from each stage. The propagation layer 840 propagates the UDD from each updated virtual model via tagged identifiers 850 from each product stage between each of the plurality of virtual models 1-V across a network 860 to mitigate compounding of error estimates across each product stage of the product lifetime to provide an extended product lifetime estimate.

The tagged identifiers 850 represent an update of uncertainty data detected by the reasoning model layer 830 which is subsequently passed to update all virtual models in the system 800. For example, if a component is substituted, the reasoning model layer 830 can indicate which component was changed and an electronic tag can be associated with the changed component such that any upstream or downstream process or assembly which uses the component can have its virtual model updated with a new probability estimate to account for the change. The UDD can be propagated via the tagged identifiers 850 that describe a common data model structure such that each virtual model can identify each component and process that has changed from at least one other virtual model.

For example, if UDD for virtual model 1 has changed, the tagged identifier 850 can communicate such change to the other virtual models on the propagation layer 830, where each of the other models can update their respective stage or domain based on the changes noted by the tagged identifier. Such processing and communications can include hundreds of thousands of components with each component, assembly, or usage associated with potentially thousands of models. As each virtual model in the propagation layer 840 is updated to account for changes in uncertainty, product lifetime change estimates can be generated by the propagation layer 840 to provide a product lifetime estimate 870 (e.g., extending or reducing lifetime estimate) based on a knowledge of overall and aggregated uncertainty across the system which can allow for liberalization of conventional, compartmentalized, and/or isolated design practices.

The system 800 can employ probabilistic reasoning methods at the reasoning model layer 830 rather than a statistical approach to minimize data needed to account for uncertainties. To capture variability inherent in product attributes such as performance, schedule, cost, and reliability, physics-based models can be employed at the physical layer 810 and the propagation layer 840 to identify pertinent cause and effect relationships and the associated random variables, their interdependencies, and their relative influence on quantities of interest. Physics-based models represent the interaction between concurrent failure modes. High-fidelity modeling can be based on experimental characterization of the pertinent microstructures, where model predictions are continually verified with focused experiments. A common uncertainty format (e.g., tagged identifiers) for statistically representative, digital, microstructure definitions enables rapid and accurate correlation between the various models. Probabilistic methods can also be employed to account for stochastic behavior and for materials variability. Reduced-order (meta-) models can be developed for field use. These surrogate models are updated more frequently as damage progresses and the requirements for uncertainty become more stringent.

A dynamic Bayesian belief network can be employed by the reasoning layer 830, in one example, and can be overlaid on the cause-and-effect structure to propagate dominant uncertainties from their sources to product parameters of interest. Random variable distributions represented at nodes in the network and their associated hyper-parameters can be updated using Bayesian learning methods, for example or other learning systems such as neural networks. A generalized version of probability distribution mapping can be used to propagate the effects of low-probability events. Uncertainty propagation via the determined UDD and tagged identifiers 850 can then be run in reverse to identify the minimum set of targeted, maximally orthogonal tests with the greatest reduction in product uncertainties regarding schedule, performance, cost, and reliability, for example. The result is a set of well-characterized random variables and the means to generate probabilistic certificates of correctness (PCoC), distributions for schedule, cost, performance, and reliability.

In general, the physical layer 810 accepts any deterministic model that produces a state space trajectory of defect size as a function of time/usage. Typically, such models involve an initial state (usually an initial flaw size), an assortment of model parameters (stress intensity factors and so forth) and usage (usually stress history) as inputs, and produce a deterministic trace of defect size evolution as a function of past and anticipated usage as an output. Any of the input variables can take on random values as characterized by probability distribution functions. Each input distribution can (optionally) be characterized by hyper-parameter distributions that can be refined through Bayesian learning at the reasoning model layer 830.

For example, data can be gathered regarding that an input flaw-size distribution is best characterized as a two-parameter Weibull distribution. For instance, different lots may show different values for these two parameters. Consequently, each of the two parameters may also be treated as random variables that may in turn be characterized by their own distributions (that may be jointly distributed). The reasoning models can include a Bayesian learning process that uses data, produced by laboratory experiments or fleet findings, to adjust the hyper-parameters that in turn improve input distributions. Reasoning also incorporates an adaptation method to personalize predictions at the individualized component level.

While input distributions refined by learning methods typically apply to the general population of components at the fleet level, each individual component has its own unique distribution that is refined using sensor data from that particular product/aircraft/component. State awareness sensors at the physical layer 810 can provide either defect detection and/or defect size, for example. Defect detection sensors (e.g., crack, corrosion, delamination sensors) generally are used in the incipient stages where defects are approaching the detection threshold of the sensor. Defect detection sensors can declare that they detect or do not detect a flaw at their detection threshold. Sensors that report defect size are generally useful when the defect is sufficiently large enough to be accurately quantified. All sensors have their associated uncertainties. System adaptation methods can account for the uncertainties in each stage as well as the uncertainties in the model to combine them appropriately to iteratively update failure predictions in the propagation layer 840 and thus correct/extend product lifetime estimate at 870.

The UDD can be updated from various types of uncertainty regarding components, manufacture, or use. Uncertainty exists in three basic forms: aleatoric, epistemic, and prejudicial. Aleatoric uncertainty (also called variability) is the inherent variation in a system that cannot be reduced. For example, components whose health is a function of use (e.g., loads on a structure) require future use information to predict remaining useful life. In most cases, future loads cannot be known exactly. As a consequence, this uncertainty cannot be entirely reduced in advance of actual usage/flight. Epistemic uncertainty usually originates from a lack of knowledge or a potential deficiency that can be corrected in theory~although not always in practice. Epistemic uncertainty is reducible by rectifying the deficiency or through a better characterization of the unknowns. Physics of failure models for example, can be used to provide a better understanding of damage progression thus reducing epistemic uncertainty. Bayesian updating methods can also be used (especially when data is sparse) to adjust assumptions regarding the underlying distributions of random variables based on experiential observations.

Prejudicial uncertainty originates from errors or bias in measurements (e.g., measurement error in sensors). Prejudicial uncertainty is also reducible if the errors can be characterized through controlled testing. Uncertainties in structural health prediction are rooted in many sources, including: the stochastic nature of the damage accumulation process within the material resulting from randomness in its microstructure; imperfect load measuring and its mapping from global kinematic usage sensors to local stresses at fatigue-critical locations; unknown local chemistry; differences between the original test spectrum and the actual flight spectrum; uncertainties in the predictive technology; errors in the fatigue tracking algorithms; sensor errors, missing and corrupted data, and so forth.

Figure 9:
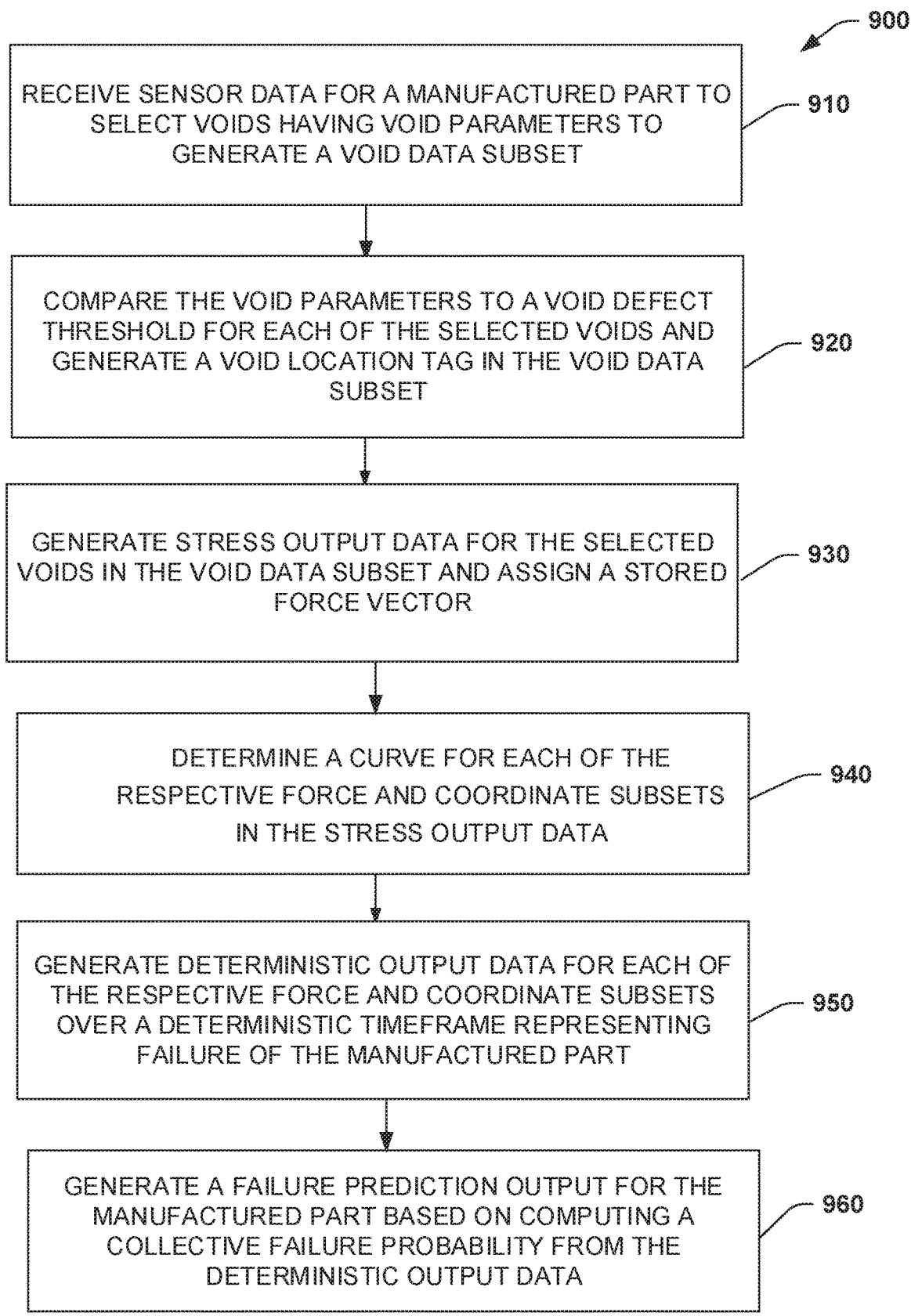
FIG. 9 illustrates an example method for prognostic qualification to facilitate development and deployment of manufacturing components.

In view of the foregoing structural and functional features described above, an example method will be better appreciated with reference to FIG. 9. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various components configured in an integrated circuit, processor, or a controller, for example.

FIG. 9 illustrates an example method 900 for prognostic qualification to facilitate development and efficient/timely deployment of manufacturing components. At 910, the method 900 includes receiving sensor data for a manufactured part to select voids having void parameters and to generate a void data subset. The selected voids indicate a potential defect in the manufactured part and the void parameters quantify and qualify the potential defect in the manufactured part. At 920, the method 900 includes comparing the void parameters to a void defect threshold for each of the selected voids and generating a void location tag in the void data subset representing coordinates on the manufactured part where the selected voids exceed the void defect threshold. At 930, the method 900 includes generating stress output data for the selected voids in the void data subset and assigning a stored force vector having a force magnitude and direction to the coordinates specified by the void location tag. The force vector models expected stress forces to be applied at the respective coordinates of the manufactured part. The stress output data is generated as force vector and coordinate subsets representing the expected stress forces to be applied at the respective coordinates of the selected voids.

At 940, the method 900 includes determining a curve for each of the respective force and coordinate subsets in the stress output data where the force vector is applied at the associated coordinates over time. At 950, the method 900 includes generating deterministic output data for each of the respective force and coordinate subsets over a deterministic timeframe representing failure of the manufactured part at the specified coordinates at a given point in time based on comparing a point on the curve to a failure threshold where failure is predicted for the manufactured part at the specified coordinates based on the applied force vector at the given point in time exceeding the failure threshold. At 960, the method 900 includes generating a failure prediction output for the manufactured part based on computing a collective failure probability from the deterministic output data with respect to the predicted failure of the selected voids over the given timeframe.

Although not shown, the method 900 can also include generating a location map indicating coordinates for the detected voids with respect to a correlated position on a surface coordinate of the manufactured part. This includes determining an area value for the detected void and determining a density value for a cluster of voids detected within a predetermined region of the manufactured part. The method 900 includes applying at least one force vector specifying a force magnitude and force direction to the detected voids selected in the void data subset. The method 900 includes generating a force vector and coordinate subset to associate at least one force vector with the void locations specified in the void data subset and generating a stress map indicating applied force vectors at the void locations. The method 900 includes generating deterministic output data indicating failure and over a deterministic timeframe by generating a curve of the force vector at the respective void coordinates with respect to time. Failure can be determined by selecting a point on the curve to a predetermined failure threshold.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system, comprising:
one or more computers executing computer executable components from a non-transitory computer readable medium, the computer executable components comprising:
a void filter having executable instructions to receive sensor data employed to produce or inspect a manufactured part, the void filter generates a void data subset by identifying voids that indicate a potential defect in the manufactured part, the void filter assigns void parameters to the identified voids to quantify and qualify the potential defect in the manufactured part, the void filter identifies the voids based on comparing the assigned void parameters of the identified voids to a void defect threshold, the void filter generates a void location tag in the void data subset representing coordinates on the manufactured part where the identified voids exceed the void defect threshold;
a stress analyzer having executable instructions to process the void data subset from the void filter and to generate stress output data for the respective identified voids in the void data subset, the stress analyzer to associate a stored force vector having a force magnitude and direction to the coordinates specified by the void location tag, the force vector to model expected stress forces to be applied at the respective coordinates of the manufactured part, the stress output data generated as force vector and coordinate subsets by the stress analyzer representing the expected stress forces to be applied at the respective coordinates of the identified voids;
at least one deterministic model having executable instructions to analyze each of the respective force and coordinate subsets from the stress output data generated by the stress analyzer, the at least one deterministic model determines a curve for each of the respective force and coordinate subsets where the force vector is applied at the associated coordinates over time, the at least one deterministic model generates deterministic output data for each of the respective force and coordinate subsets over a deterministic timeframe representing failure of the manufactured part at the specified coordinates at a given point in time, the deterministic model compares a point on the curve to a failure threshold where failure is predicted for the manufactured part at the specified coordinates based on the applied force vector at the given point in time exceeding the failure threshold, such that a minimum time that failure is not likely to occur is based on the applied force vector at the given point in time exceeding the failure threshold; and
a prognostic analyzer having executable instructions to process the deterministic output data from the at least one deterministic model and to generate a failure prediction output for the manufactured part based on computing a collective failure probability from the deterministic output data with respect to the predicted failure of the identified voids over the given timeframe, wherein the prognostic analyzer determines the collective failure probability by analyzing a probability estimate for identified voids and associated force vectors to generate a likelihood of failure estimate at a time before the failure in the deterministic timeframe to a prediction of the minimum time that the failure is not likely to occur.

2. The system of claim 1, further comprising a process monitor having executable instructions to monitor a plurality of sensors to generate the sensor data, the plurality of sensors coupled to a machine to produce the manufactured part or to a process variable affecting quality of the manufactured part, the sensors include at least one of a voltage sensor, a current sensor, a power sensor, a position sensor, a velocity sensor, an accelerometer, a strain gauge, a surface quality sensor, a camera sensor, an x-ray sensor, and a microscope sensor.

3. The system of claim 2, wherein the process monitor includes a processor and a program memory storing the executable instruction and a random memory to store the sensor data, the process monitor includes at least one of an analog-to-digital converter (ADC) to convert received sensor signals to the sensor data.

4. The system of claim 2, wherein the void parameters characterize the sensor data that further characterizes a surface of the manufactured part, wherein the void parameters exceeding the void defect threshold indicates that the void is present in the manufactured part.

5. The system of claim 1, wherein the void filter executable instructions generates a location map indicating a location for the respective detected voids with respect to a correlated position on a surface coordinate of the manufactured part.

6. The system of claim 5, wherein the void filter executable instructions includes a size analyzer to determine an area value for the respective detected voids and a density analyzer to determine a density value for a cluster of voids detected within a predetermined region of the manufactured part.

7. The system of claim 6, wherein the void filter executable instructions selects the respective detected voids in the void data subset by comparing the area value to a predetermined area threshold and selecting voids that are greater in size than specified by the area threshold or by comparing the density value for the cluster of voids to a cluster region threshold and selecting void clusters that are greater in size than specified by the cluster region threshold.

8. The system of claim 7, wherein the stress analyzer executable instructions includes a force analyzer to apply at least one force vector specifying the force magnitude and force direction to the respective voids identified in the void data subset, the stress analyzer executable instruction includes a location analyzer executable instruction to process the void data subset from the void filter to associate the at least one force vector with the void locations coordinates specified in the void data subset, and to generate a stress map indicating applied force vectors at the identified void coordinates.

9. The system of claim 8, wherein the at least one deterministic model executable instructions processes force data from the stress map and generates the deterministic output data indicating failure and over a deterministic timeframe by generating a curve of the force vector at the respective void coordinates with respect to time, wherein failure is determined by an executable instruction comparison to a point on the curve to a predetermined failure threshold.

10. The system of claim 9, the prognostic analyzer further comprising executable instructions that include at least one learning model to generate the likelihood of failure estimate based on a statistical determination of the learning model, wherein the learning model includes a classifier or a neural network to perform the statistical determination based on the probability estimate to the collection of selected voids.

11. The system of claim 1, further comprising a concurrent uncertainty management system having executable instructions to receive the failure prediction output from the prognostic model, determine a product life estimate based on processing the failure prediction output, and update executable instructions or data of at least one of the void filter, the stress analyzer, the deterministic model, and the prognostic model based on the processing.

12. The system of claim 1, further comprising a real time data generator to update at least one of the void filter, stress analyzer, deterministic model, and the prognostic analyzer based on vehicle data received from the real time data generator, where the vehicle data is collected from a data recorder associated with an aircraft, a helicopter, a land vehicle, a ship, a space craft, a satellite, or a drone.

13. A computer-implemented method, comprising:
receiving sensor data for a manufactured part to select voids having void parameters to generate a void data subset, the selected voids indicate a potential defect in the manufactured part, the void parameters quantify and qualify the potential defect in the manufactured part;
comparing the void parameters to a void defect threshold for each of the selected voids and generating a void location tag in the void data subset representing coordinates on the manufactured part where the selected voids exceed the void defect threshold;
generating stress output data for the selected voids in the void data subset and assigning a stored force vector having a force magnitude and direction to the coordinates specified by the void location tag, the force vector to model expected stress forces to be applied at the respective coordinates of the manufactured part, the stress output data generated as force vector and coordinate subsets representing the expected stress forces to be applied at the respective coordinates of the selected voids;
determining a curve for each of the respective force and coordinate subsets in the stress output data where the force vector is applied at the associated coordinates over time;
generating deterministic output data for each of the respective force and coordinate subsets over a deterministic timeframe representing failure of the manufactured part at the specified coordinates at a given point in time based on comparing a point on the curve to a failure threshold where failure is predicted for the manufactured part at the specified coordinates based on the applied force vector at the given point in time exceeding the failure threshold, such that a minimum time that failure is not likely to occur is based on the applied force vector at the given point in time exceeding the failure threshold; and
generating a failure prediction output for the manufactured part based on computing a collective failure probability from the deterministic output data with respect to the predicted failure of the selected voids over the given timeframe, wherein the collective failure probability is computed by analyzing a probability estimate for identified voids and associated force vectors to generate a likelihood of failure estimate at a time before the failure in the deterministic timeframe to a prediction of the minimum time that the failure is not likely to occur.

14. The method of claim 13, further comprising monitoring data from a real time system or a concurrent uncertainty management system; and
updating at least one model to reduce uncertainty in the failure prediction output based on the monitoring of data.

15. The method of claim 14, further comprising:
determining an area value for the selected voids; and
determining a density value for a cluster of voids detected within a predetermined region of the manufactured part.

16. The method of claim 15, further comprising comparing the area value to a predetermined area threshold and selecting voids that are greater in size than specified by the area threshold or by comparing the density value for the cluster of voids to a cluster region threshold and selecting void clusters that are greater in size than specified by the cluster region threshold.

17. The system of claim 13, further comprising determining a collective failure probability by analyzing a probability estimate for the selected voids to generate a likelihood of failure estimate at a time before failure in the deterministic timeframe to an estimate of a minimum time that the failure is not likely to occur.

18. The system of claim 17, further comprising configuring at least one learning model to generate the likelihood of failure estimate.

19. The method of claim 13, wherein the void parameters characterize the sensor data that further characterizes a surface of the manufactured part, wherein the void parameters exceeding the void defect threshold indicates that the void is present in the manufactured part.

20. A non-transitory computer readable medium having computer executable instructions stored thereon, the instructions configured to:
process sensor data for a manufactured part, and to select voids having void parameters and generate a void data subset, the selected voids indicate a potential defect in the manufactured part, the void parameters quantify and qualify the potential defect in the manufactured part;
analyze the void parameters with respect to a void defect threshold for each of the selected voids and to generate a void location tag in the void data subset representing coordinates on the manufactured part where the selected voids exceed the void defect threshold;
process the void data subset, generate stress output data for the selected voids in the void data subset, assign a stored force vector having a force magnitude and direction to the coordinates specified by the void location tag, wherein the stress output data is generated as force vector and coordinate subsets representing the expected stress forces to be applied at the respective coordinates of the selected voids;
determine a curve for each of the respective force and coordinate subsets in the stress output data where the force vector is applied at the associated coordinates over time;
generate deterministic output data for each of the respective force and coordinate subsets over a deterministic timeframe representing failure of the manufactured part at the specified coordinates at a given point in time based on comparing a point on the curve to a failure threshold where failure is predicted for the manufactured part at the specified coordinates based on the applied force vector at the given point in time exceeding the failure threshold, such that a minimum time that failure is not likely to occur is based on the applied force vector at the given point in time exceeding the failure threshold; and generate a failure prediction output for the manufactured part based on computing a collective failure probability from the deterministic output data with respect to the predicted failure of each of the selected voids over the given timeframe, wherein the collective failure probability is computed by analyzing a probability estimate for identified voids and associated force vectors to generate a likelihood of failure estimate at a time before the failure in the deterministic timeframe to a prediction of the minimum time that the failure is not likely to occur.

21. The computer readable medium of claim 20, the instructions further comprising instructions to monitor data from a real time system or a concurrent uncertainty management system and to update at least one model to reduce uncertainty in the failure prediction output based on the monitoring of data.

22. The computer readable medium of claim 20, wherein the void parameters characterize the sensor data that further characterizes a surface of the manufactured part, wherein the void parameters exceeding the void defect threshold indicates that the void is present in the manufactured part.

* * * * *